US012576853B1

(12) United States Patent
Yu

(10) Patent No.: US 12,576,853 B1
(45) Date of Patent: Mar. 17, 2026

(54) METHOD AND APPARATUS FOR CONTROLLING A TRAILER-MOUNTED VEHICLE TO PREVENT REAR-END COLLISIONS

(71) Applicants: HYUNDAI MOTOR COMPANY, Seoul (KR); KIA CORPORATION, Seoul (KR)

(72) Inventor: Seung Eun Yu, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/073,561

(22) Filed: Mar. 7, 2025

(30) Foreign Application Priority Data

Sep. 13, 2024 (KR) ........................ 10-2024-0125686

(51) Int. Cl.
*B60W 30/02* (2012.01)
*B60W 30/18* (2012.01)
*B60W 30/188* (2012.01)

(52) U.S. Cl.
CPC .......... *B60W 30/188* (2013.01); *B60W 30/02* (2013.01); *B60W 30/18109* (2013.01); *B60W 2300/145* (2013.01); *B60W 2520/22* (2013.01)

(58) Field of Classification Search
CPC ............... B60W 30/188; B60W 30/02; B60W 30/18109; B60W 2300/145; B60W 2520/22
See application file for complete search history.

(56) References Cited

U.S. PATENT DOCUMENTS

| 11,458,956 B2 | 10/2022 | Kim |
| 11,897,473 B2 | 2/2024 | Itagaki |
| 2015/0165850 A1 | 6/2015 | Chiu et al. |
| 2020/0001920 A1 | 1/2020 | Hejase et al. |
| 2021/0039632 A1 | 2/2021 | Kim |
| 2022/0314718 A1 | 10/2022 | Nguyen et al. |
| 2022/0355772 A1 | 11/2022 | Matschke et al. |
| 2023/0406303 A1 | 12/2023 | Oishi |

(Continued)

FOREIGN PATENT DOCUMENTS

| CN | 102582626 B | * | 6/2015 | ............ B60W 30/02 |
| DE | 102005018486 A1 | * | 11/2006 | .......... B60W 50/082 |

(Continued)

*Primary Examiner* — Tisha D Lewis
(74) *Attorney, Agent, or Firm* — Lempia Summerfield Katz LLC

(57) ABSTRACT

A method and a device to control a trailer-mounted vehicle. The method for controlling a trailer-mounted vehicle may include: determining, based on current motion information of a vehicle, a force acting due to a gradient of a trailer mounted to the vehicle and an inertial force of the trailer, determining Z-axis momentum of the vehicle caused by the trailer based on the force acting due to the gradient of the trailer, the inertial force of the trailer, and the current motion information of the vehicle; determining a compensation amount of the Z-axis momentum based on target motion information of the vehicle and the Z-axis momentum; and controlling at least one of a drive source and a brake source so that a lopsided acceleration or a lopsided deceleration is output from a corresponding wheel for implementing the compensation amount Z-axis momentum.

18 Claims, 7 Drawing Sheets

<u>100</u>

150

(56)          References Cited

U.S. PATENT DOCUMENTS

| 2023/0415748 | A1 | 12/2023 | Itagaki |
| 2024/0010036 | A1 | 1/2024 | Dhaens et al. |
| 2024/0042973 | A1 | 2/2024 | Kirmaier et al. |
| 2024/0067220 | A1 | 2/2024 | Shahriari et al. |
| 2024/0270214 | A1* | 8/2024 | Goodarzi .............. B60T 13/662 |

FOREIGN PATENT DOCUMENTS

| JP | 2020032982 | A | 3/2020 |
| JP | 2023183869 | A | 12/2023 |
| JP | 2024003665 | A | 1/2024 |
| KR | 20010037070 | A | 5/2001 |
| KR | 20060129609 | A | 12/2006 |
| KR | 20210018731 | A | 2/2021 |

* cited by examiner

METHOD AND APPARATUS FOR CONTROLLING A TRAILER-MOUNTED VEHICLE TO PREVENT REAR-END COLLISIONS

CROSS-REFERENCE TO RELATED APPLICATION(S)

This application claims priority under 35 U.S.C. 119 to Korean Patent Application No. 10-2024-0125686, filed on Sep. 13, 2024, in the Korean Intellectual Property Office, the disclosure of which is herein incorporated by reference in its entirety.

TECHNICAL FIELD

The present disclosure relates to control of a vehicle and, more specifically, to a method and a device for controlling a trailer-mounted vehicle.

BACKGROUND

The increasing camping and leisure activities in modern society have brought a rapid increase in the use of trailers. A trailer indicates equipment such as an additional loading space for cargo transport or leisure equipment such as a camper van, which is connected to the rear of a vehicle and towed by the vehicle. However, small trailers often do not have brake devices installed because they are not required by law. As a result, the towing vehicle must perform both acceleration and deceleration, which may cause problems with driving stability.

In particular, when driving on a curved road, the trailer's inertia affects the steering performance of the vehicle, and the effect is greater on a road with a gradient. For example, when accelerating on an uphill section or decelerating on a downhill section, the trailer pushes or pulls the rear of the towing vehicle, which reduces driving stability.

The statements in this Background section merely provide background information related to the present disclosure and may not constitute prior art.

SUMMARY

The present disclosure aims to solve the driving and steering stability problems that may occur during acceleration and deceleration of a trailer-mounted vehicle.

The present disclosure also aims to improve the driving and steering stability through outer wheel braking or inner wheel driving, or inner wheel braking or outer wheel driving when oversteer or understeer occurs due to the gradient resistance and inertial force of the vehicle.

The technical aspects pursued in the present disclosure may not be limited to the above-mentioned technical aspects, and other technical aspects, which are not mentioned herein, should be more clearly understood from the following descriptions by those having ordinary skill in the art to which the present disclosure pertains.

According to one aspect of the present disclosure, a method for controlling a trailer-mounted vehicle may include: determining, based on current motion information of a vehicle, a force acting due to a gradient of a trailer mounted on the vehicle and an inertial force of the trailer; determining Z-axis momentum of the vehicle due to (i.e., caused by) the trailer based on the force acting due to the gradient of the trailer, the inertial force of the trailer, and the current motion information of the vehicle; determining a compensation amount of the Z-axis momentum based on target motion information of the vehicle and the Z-axis momentum; and controlling at least one of a drive source and a brake source so that a lopsided acceleration or a lopsided deceleration is output from a corresponding wheel for implementing the compensation amount of the Z-axis momentum.

In an embodiment, the Z-axis momentum may indicate a quantity of motion of the vehicle in a Z-axis direction.

In an embodiment, the compensation amount of the Z-axis momentum may be determined based on a difference in deceleration force between left and right wheels when the vehicle decelerates.

In an embodiment, implementing the compensation amount of the Z-axis momentum may be achieved by applying the same amount of deceleration force (i.e., an equal deceleration force) to the left and right wheels in opposite directions while the vehicle decelerates.

In an embodiment, the compensation amount of the Z-axis momentum may be determined based on a difference in acceleration force between left and right wheels when the vehicle accelerates.

In an embodiment, implementing the compensation amount of the Z-axis momentum may be achieved by applying a lopsided deceleration to one wheel among the left and right wheels, and the compensation amount of the Z-axis momentum is configured to cause the drive source to output a driving force corresponding to the amount of the lopsided deceleration when the vehicle accelerates.

In an embodiment, the current motion information may include a gradient of a road, a current acceleration of the vehicle, and a current steering angle of the vehicle.

In an embodiment, the target motion information may include a target steering angle, an accelerator pedal position, and a brake pedal position.

In an embodiment, the drive source may separately control a driving force for each wheel.

According to another aspect of the present disclosure, a device (i.e., an apparatus) for controlling a trailer-mounted vehicle may include a processor, a drive source driven by the processor, and a brake source driven by the processor. The processor may be configured to: determine, based on current motion information of a vehicle, a force acting due to a gradient of a trailer mounted to a vehicle and an inertial force of the trailer; determine Z-axis momentum of the vehicle due to (i.e., caused by) the trailer based on the force acting due to the gradient of the trailer, the inertial force of the trailer, and the current motion information of the vehicle; determine a compensation amount of the Z-axis momentum based on target motion information of the vehicle and the Z-axis momentum; and control at least one of a drive source and a brake source so that a lopsided acceleration or a lopsided deceleration is output from a corresponding wheel for implementing the compensation amount of the Z-axis momentum.

In an embodiment, the Z-axis momentum may indicate a quantity of motion of the vehicle in a Z-axis direction.

In an embodiment, the compensation amount of the Z-axis momentum may be determined based on a difference in deceleration force between left and right wheels in response to the vehicle decelerating.

In an embodiment, implementing the compensation amount of the Z-axis momentum may be achieved by applying the same amount of deceleration force (i.e., an equal amount of deceleration force) to the left and right wheels in opposite directions while the vehicle decelerates.

In an embodiment, the compensation amount of the Z-axis momentum may be determined based on a difference in acceleration force between left and right wheels in response to the vehicle accelerating.

In an embodiment, implementing the compensation amount of the Z-axis momentum may be achieved by applying a lopsided deceleration to one wheel among the left and right wheels, and the compensation amount of the Z-axis momentum may be configured to cause the drive source to output a driving force corresponding to the amount of the lopsided deceleration in response to the vehicle accelerating.

In an embodiment, the current motion information may include a gradient of a road, a current acceleration of the vehicle, and a current steering angle of the vehicle.

In an embodiment, the target motion information may include a target steering angle of the vehicle, an accelerator pedal position, and a brake pedal position.

In an embodiment, the drive source may separately control a driving force for each wheel.

According to various embodiments of the present disclosure described above, it is possible to reduce sensitive actions and miscontrols (i.e., errored controls) or false alarms that lower reliability by causing discomfort and fatigue to the vehicle occupants, thereby improving the reliability of the vehicle system.

In addition, the present disclosure provides consistent rear-end cross-collision avoidance assistance to the vehicle drivers.

Advantageous effects obtainable from the present disclosure are not limited to the above-mentioned effects, and other effects which are not mentioned herein should be clearly understood from the following descriptions by those having ordinary skill in the art to which the present disclosure pertains.

BRIEF DESCRIPTION OF THE DRAWINGS

The above and other aspects, features, and advantages of the present disclosure should be more apparent from the following detailed description taken in conjunction with the accompanying drawings.

Figure 1:
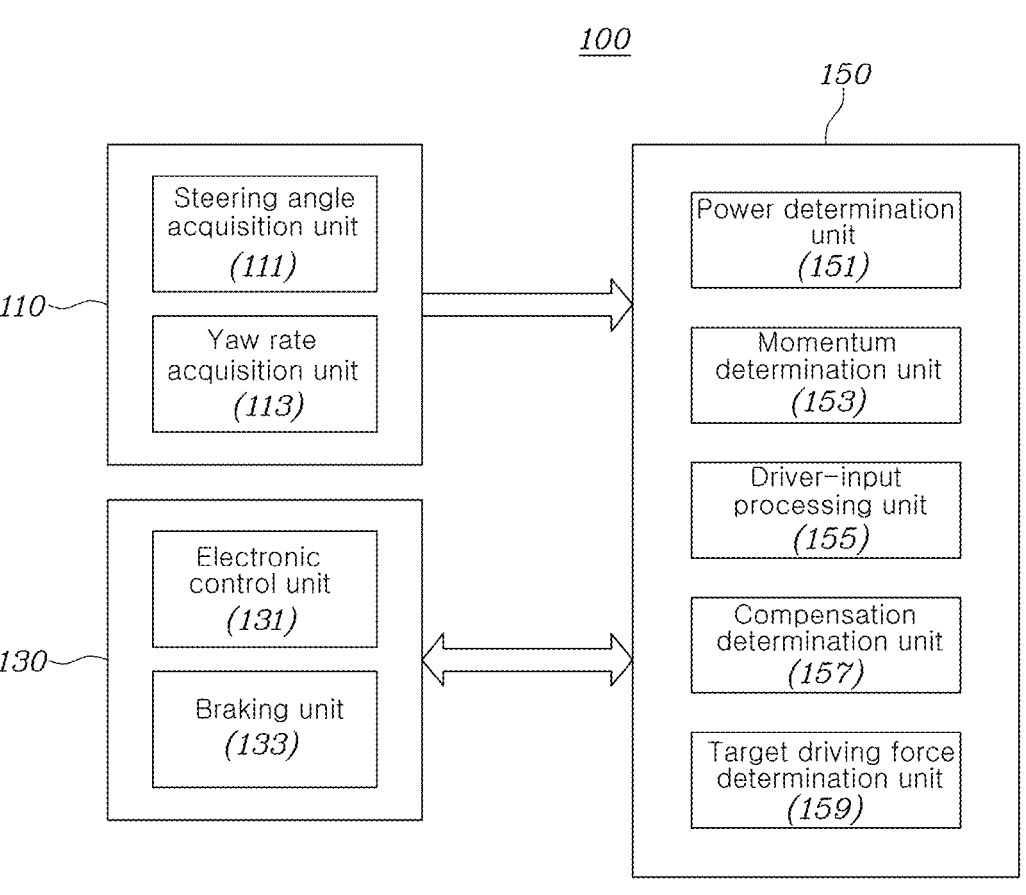
FIG. 1 is a block diagram illustrating a driving control device of a trailer-mounted vehicle according to an embodiment of the present disclosure.

The drawings described herein are for illustration purposes only and are not intended to limit the scope of the present disclosure in any way.

DETAILED DESCRIPTION

Hereinafter, embodiments set forth herein are described in detail with reference to the accompanying drawings, and the same or similar elements are given the same and similar reference numerals regardless of figure numbers, so duplicate descriptions thereof have been omitted. The terms "module" and "unit" used for the elements in the following description are given or interchangeably used in consideration of only the ease of writing the specification, and do not have distinct meanings or roles by themselves. Furthermore, in describing embodiments set forth herein, a detailed description of known relevant technologies has been omitted when it is determined that the description may make the subject matter of embodiments of the present disclosure unclear. In addition, it should be appreciated that the accompanying drawings are provided only for the sake of easy understanding of embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" and the like may be used to describe various elements, but the elements are not limited to the terms. The above terms are used merely for the purpose of distinguishing one element from other elements.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

A singular expression may include a plural expression unless they are definitely different in a context.

As used herein, the expression "include," "comprise," or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

When a component, unit, module, processor, controller, device, element, apparatus, or the like of the present disclosure is described as having a purpose or performing an operation, function, or the like, the component, unit, module, processor, controller, device, element, apparatus, or the like should be considered herein as being "configured to" meet that purpose or to perform that operation or function. Each component, unit, module, processor, controller, device, element, apparatus, and the like may separately embody or be included with a processor and a memory, such as a non-transitory computer readable media, as part of the apparatus. The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

The present disclosure may be variously modified and include various embodiments in which specific embodiments are described in detail hereinbelow. However, it shall be understood that the specific embodiments are not intended to limit the present disclosure thereto and cover all the modifications, equivalents and substitutions which belong to the idea and technical scope of the present disclosure.

FIG. 1 is a block diagram illustrating a driving control device of a trailer-mounted vehicle according to an embodiment of the present disclosure.

Referring to FIG. 1, a driving control device 100 of a trailer-mounted vehicle according to an embodiment of the present embodiment includes a dynamic sensor 110, an electronic control and braking unit 130, and a processor 150.

The dynamic sensor 110 acquires information of a steering angle and a yaw rate of a vehicle. The dynamic sensor 110 includes a steering angle acquisition unit 111 and a yaw rate acquisition unit 113.

The steering angle acquisition unit 110 acquires information of a steering angle of the vehicle and transmits the same to the processor 150.

The steering angle acquisition unit 111 may be MDPS (motor driven power steering) of the vehicle.

The yaw rate acquisition unit 113 acquires information of a yaw rate of the vehicle and transmits the same to the processor 150.

The yaw rate acquisition unit 113 may be a CDCU (chassis domain control unit) and/or a TCS (traction control system) of the vehicle.

The electronic control and braking unit 130 manages the electronic control and braking system of the vehicle.

The electronic control and braking unit 130 includes an electronic control unit 131 and a braking unit 133.

The electronic control unit 131 acquires information of a driving force of the vehicle, a slope of the road, a weight of the trailer, and an accelerator pedal position (APS), transmits them to the processor 150, receives information of driving forces of respective wheels from the processor 150, and controls a drive source (not shown) of the vehicle based on the same.

The electronic control unit 131 may be an ECU (electronic control unit) and/or a VPC (vehicle power control) of the vehicle.

The APS indicates the driver's pressure on the accelerator pedal.

The braking unit 133 acquires information of a braking force of the vehicle and a brake pedal position (BPS), transmits them to the processor 150, receives information of braking forces of respective wheels from the processor 150, and brakes the vehicle based on the same.

The braking unit 133 may be an integrated electric brake (IEB) of the vehicle.

The braking unit 133 may be defined as a brake source.

The BPS indicates the driver's pressure on the brake pedal.

The power determination unit 151 determines the gradient resistance or gradient acceleration force due to (i.e., caused by) the trailer based on the basis of information of the slope angle of the road and the weight of the trailer, information of which is acquired from the electronic control unit 131, and determines the inertial force of the trailer based on the driving force or braking force of the vehicle, information of which is acquired from the electronic control unit 131 or the braking unit 133.

The gradient resistance or gradient acceleration force due to the trailer may be determined based on the slope angle of the road and the weight of the trailer.

The gradient resistance or gradient acceleration force due to the trailer may be defined as a force acting due to the gradient of the trailer.

The gradient resistance due to the trailer indicates the resistance generated by the trailer when driving on a steep road. This is a resistant force generated by gravity when the trailer goes up a slope, and is proportional to the slope angle of the road and the weight of the trailer.

The gradient acceleration force of the trailer indicates an acceleration force generated by the trailer when driving on a steep road. This is an acceleration force generated by gravity when the trailer goes down a slope, and is proportional to the slope angle of the road and the weight of the trailer.

Figure 2:
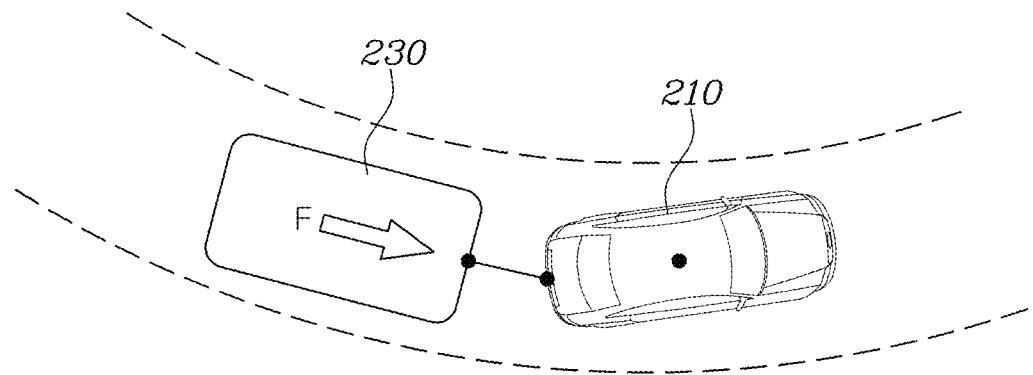
FIG. 2 is a diagram illustrating the inertial force of a trailer, which may be determined by the power determination unit in FIG. 1.

Referring to FIG. 2, the inertial force of the trailer 230 indicates the force by which the trailer 230 continues to move in the original direction (e.g., in the current direction) and at the original speed (e.g., at the current speed) when the vehicle 210 mounted with the trailer 230 turns or brakes while driving.

The inertial force by the trailer 230 may be determined based on the weight of the trailer 230 and the acceleration of the vehicle 210.

The inertial force by the trailer 230 may be calculated by Equation 1 below.

$$F = m \times a \qquad \text{[Equation 1]}$$

In Equation 1, F represents the inertial force, m represents the weight of the trailer 230, and a represents the acceleration of the vehicle 210.

The acceleration of the vehicle 210 may be determined based on the driving force or braking force of the vehicle 210, and the steering direction of the vehicle.

The gradient of the road, the current acceleration of the vehicle, and the current steering angle may be defined as current motion information of the vehicle.

Therefore, the inertial force due to the trailer 230 may be determined based on the weight of the trailer 230 and the current motion information of the vehicle 210.

The momentum determination unit 153 determines the Z-axis momentum of the vehicle cause by (i.e., generated by) the trailer based on the gradient resistance due to (i.e., generated by) the trailer and the inertial force of the trailer determined by the power determination unit 151.

The Z-axis momentum indicates the quantity of motion of the vehicle mounted with the trailer in the Z-axis direction. The greater the momentum, the more force is required to stop the vehicle or change the direction thereof.

Figure 3:
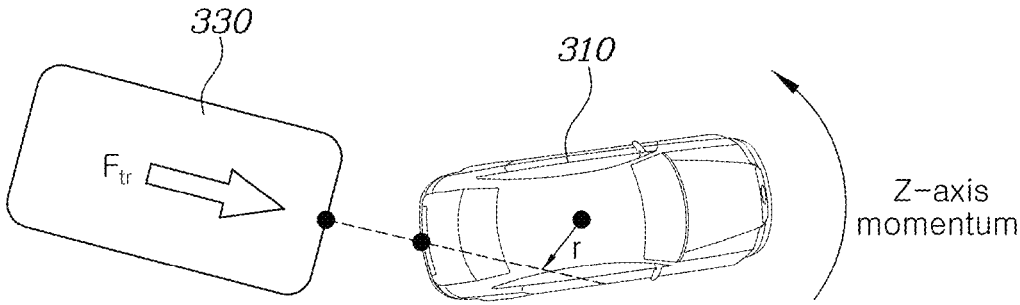
FIG. 3 is a diagram illustrating the Z-axis momentum of a trailer-mounted vehicle, which may be determined by the momentum determination unit in FIG. 1.

Referring to FIG. 3, the Z-axis momentum of the vehicle 310 due to the trailer 330 represents the force received by the gradient acceleration force and inertial force of the trailer 330 when the vehicle 310 mounted with the trailer 330 accelerates or decelerates on a curved road.

The Z-axis momentum of the vehicle 310 due to the trailer 330 may be calculated by Equation 2 below.

$$\text{Z-axis momentum} = F_{tr} \times r \qquad \text{[Equation 2]}$$

In Equation 2, $F_{tr}$ represents the sum of the gradient acceleration force, which is the acceleration force generated when the trailer goes up and down a slope, and the inertial force, which is the force generated by the mass and speed of the trailer, and is a vector value of the quantity of motion.

In addition, r represents the distance from the center of gravity of the vehicle to the point where the force is applied to the wheel, and is a position vector value.

The deceleration force or acceleration force may differ between the left and right wheels of the vehicle due to the Z-axis momentum.

The driver-input processing unit 155 determines a target acceleration of the vehicle on the basis of the driver's APS and BPS, and determines a target driving direction of the vehicle on the basis of the steering angle received from the MDPS.

The compensation determination unit 157 determines the compensation amount of the Z-axis momentum based on target motion information and the Z-axis momentum of the vehicle.

The target motion information may include the target steering angle, the APS, and the BPS of the vehicle.

The compensation amount of the Z-axis momentum may be defined as the compensation momentum.

The compensation momentum may be determined based on the target motion information of the vehicle and the difference in the deceleration force or acceleration force between the left and right wheels.

The difference in the deceleration force or acceleration force between the left and right wheels may be determined by the Z-axis momentum.

The compensation determination unit 157 may determine the compensation momentum based on the difference in the deceleration force between the left and right sides of the vehicle (e.g., between the left and right wheels) when the vehicle 410 decelerates.

Figure 4:
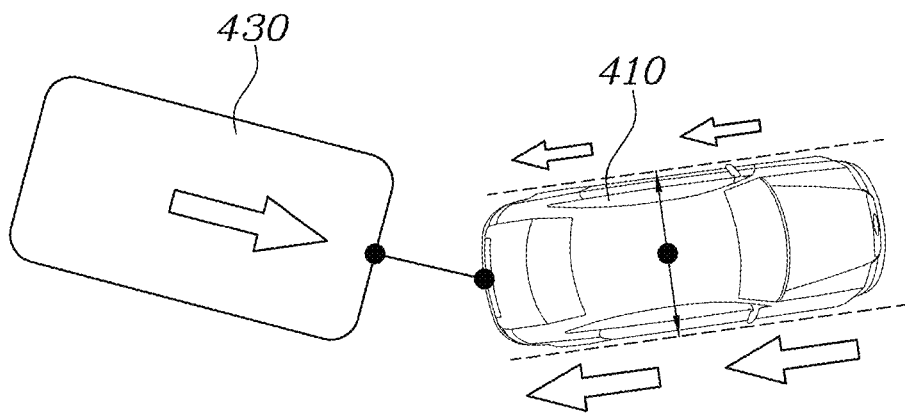
FIG. 4 is a diagram illustrating the Z-axis momentum compensation amount of a trailer-mounted vehicle, which may be determined by a compensation determination unit when the trailer-mounted vehicle decelerates.

Referring to FIG. 4, if the combined force of the inertial force and the gradient acceleration force of the trailer 430 is directed toward the right front of the vehicle, the Z-axis momentum due to the trailer is generated toward the right front, so that the braking force may be further required for the right wheel when the vehicle is braking.

he compensation determination unit 157 may set the compensation momentum so as to further brake the wheel that requires more braking force or so as to brake less the wheel that requires less braking force, thereby maintaining the stability of the vehicle.

In addition, the compensation determination unit 157 may set the compensation momentum by applying the same amount of deceleration force with different signs (e.g., opposite signs) to the left and right wheels when the vehicle decelerates.

For example, a negative amount of deceleration force may be applied to the left wheel and a positive amount of deceleration force may be applied to the right wheel, thereby setting the compensation momentum.

The compensation momentum may be calculated by Equation 3 below.

$$\text{compensation momentum} = \text{right deceleration force} \times r - \text{left deceleration force} \times r \qquad \text{[Equation 3]}$$

In Equation 3 above, the compensation momentum represents the compensation amount of the Z-axis momentum required for the vehicle, and r represents the distance from the vehicle's wheel to the center of gravity.

Therefore, the compensation determination unit 157 may determine the compensation momentum to be the value acquired by subtracting a product of the distance from the center of gravity of the vehicle and the right deceleration force from a product of the distance from the center of gravity of the vehicle and the left deceleration force when the vehicle decelerates.

The compensation determination unit 157 may determine the compensation momentum based on the difference in acceleration force between the left and right sides when the vehicle accelerates.

The compensation determination unit 157 may set the compensation momentum so as to decelerate the wheel having more acceleration force, thereby maintaining the stability of the vehicle.

Figure 5:
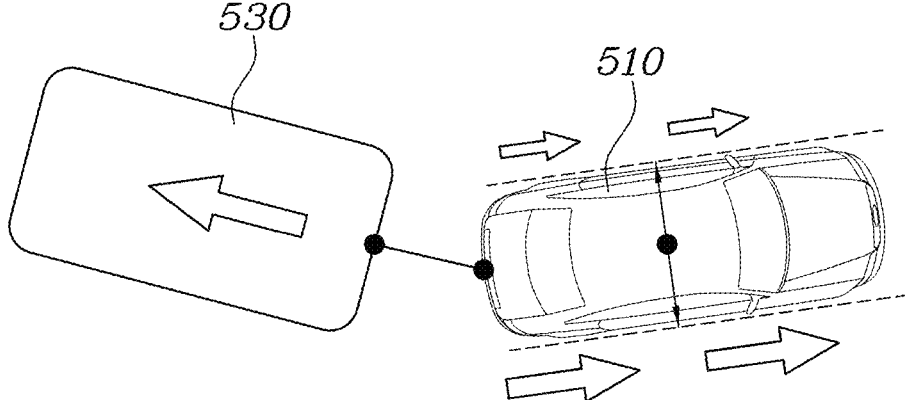
FIG. 5 is a diagram illustrating the Z-axis momentum compensation amount of a trailer-mounted vehicle, which may be determined by a compensation determination unit when the trailer-mounted vehicle accelerates.

Referring to FIG. 5, if the combined force of the inertial force and the gradient acceleration force of the trailer 430 is directed toward the left rear of the vehicle, the Z-axis momentum due to (i.e., caused by) the trailer is generated toward the left rear, so that the right wheel may require more acceleration force when the vehicle accelerates.

The compensation determination unit 157 may be configured to apply a lopsided deceleration to one wheel when the vehicle accelerates and cause the drive source to output more driving force by the amount of the lopsided deceleration.

The compensation momentum may be calculated by Equation 4 below.

$$\text{compensation momentum} = \text{left acceleration force} \times r - \text{right acceleration force} \times r \qquad \text{[Equation 4]}$$

In Equation 4 above, the compensation momentum represents the compensation amount of the Z-axis momentum required for the vehicle, and r represents the distance from the vehicle's wheel to the center of gravity.

In an embodiment shown in FIG. 5, the compensation momentum may be a negative number, and the right wheel may be decelerated by the amount of the compensation momentum.

Therefore, the compensation determination unit 157 may determine the compensation momentum to be the value acquired by subtracting a product of the distance from the center of gravity of the vehicle and the right acceleration force from a product of the distance from the center of gravity of the vehicle and the left acceleration force when the vehicle accelerates.

The target driving force determination unit 159 reflects the compensation amount of the Z-axis momentum determined by the compensation determination unit 157 to the target motion information of the vehicle determined by the driver-input processing unit 155, determines the compensated speed and acceleration of the vehicle and the compensated driving direction of the vehicle, and transmits the same to the electronic control and braking unit 130.

The target motion information may include the target steering angle, the APS, and the BPS.

The target driving force determination unit 159 may perform driving force control for each wheel in the case of a vehicle capable of driving force control for each wheel.

If the driving force control is impossible for each wheel, the target driving force determination unit 159 performs lopsided braking after outputting the driving force, thereby implementing the entire driving force.

The target driving force determination unit 159 may add a driving force equivalent to the lopsided deceleration so as to maintain the entire target driving force so that the driver does not feel a sense of incongruity due to the lopsided braking.

However, the target driving force determination unit 159 may not perform the lopsided braking when the driver requests a large driving force.

Figure 6:
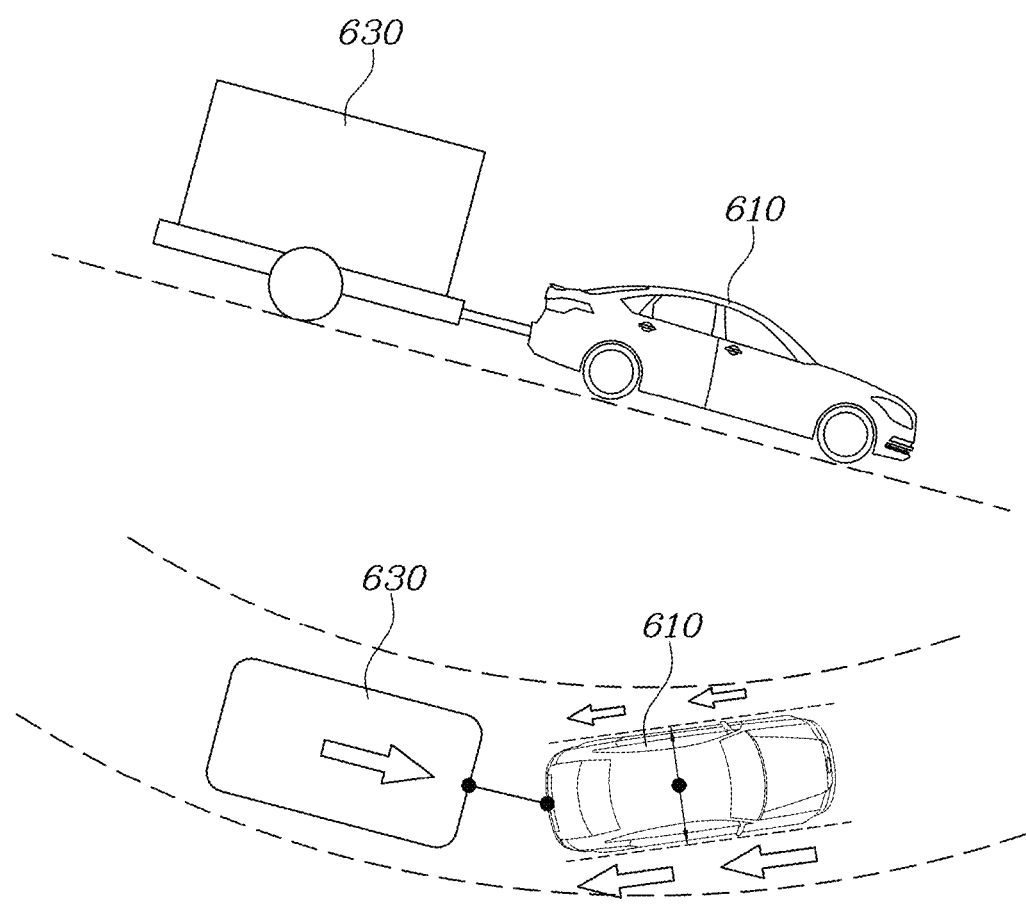
FIG. 6 is a diagram illustrating an example of compensating for the Z-axis momentum that occurs when a trailer-mounted vehicle drives on a downhill turning section.

FIG. 6 is a diagram illustrating an example of compensating for the Z-axis momentum that occurs when a trailer-mounted vehicle drives on a downhill turning section.

Referring to FIG. 6, when the trailer-mounted vehicle drives on a downhill turning section, the trailer 630 generates a Z-axis momentum against the vehicle 610 due to the inertial force and gradient (gravity). This indicates additional turning force that occurs when the vehicle turns downhill.

The power determination unit 151 determines the gradient resistance or gradient acceleration force of the trailer 630 based on the slope of the road and the weight of the trailer 630 acquired from the electronic control unit 131, and determines the inertial force of the trailer 630 on the basis of the weight of the trailer 630 and the driving force or braking force of the vehicle 610.

In addition, the momentum determination unit 153 determines the Z-axis momentum of the vehicle due to the trailer 630 based on the gradient resistance and inertial force of the trailer 630 determined by the power determination unit 151.

In addition, the compensation determination unit 157 determines excessive Z-axis momentum based on the Z-axis momentum determined by the momentum determination unit 153 and the current steering angle determined by the driver-input processing unit 155. This is important for maintaining the stability of the vehicle by accurately calculating the additional rotational force generated when the vehicle turns.

The target driving force determination unit 159 determines the lopsided braking based on the driver's target steering determined by the momentum determination unit 153 and the excessive Z-axis momentum.

When the vehicle 610 tends to further turn to the left than the driver's intention due to the gradient resistance and inertial force of the trailer 630 as shown in FIG. 6, the target driving force determination unit 159 may apply a greater braking force to the right wheel of the vehicle to compensate for the imbalance that occurs when the vehicle turns downhill, thereby assisting in maintaining the stability of the vehicle.

Figure 7:
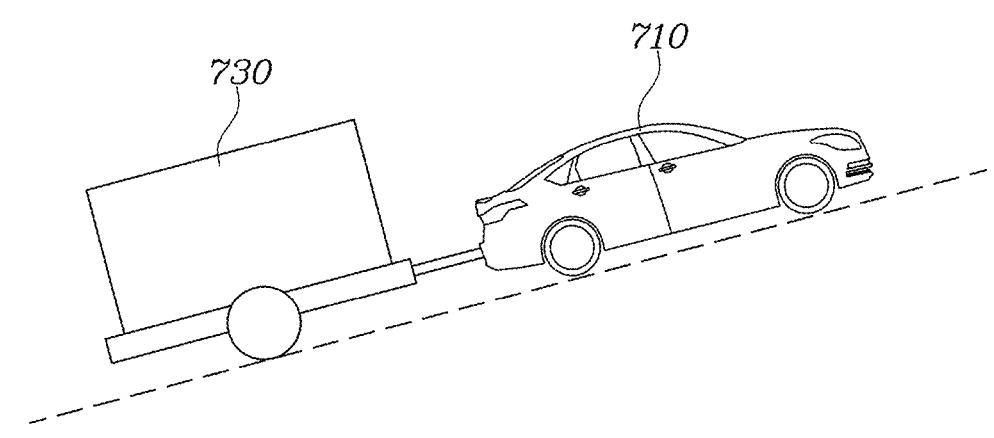
FIG. 7 is a diagram illustrating an example of compensating for the Z-axis momentum that occurs when a trailer-mounted vehicle drives on an uphill turning section.
Figure 7:
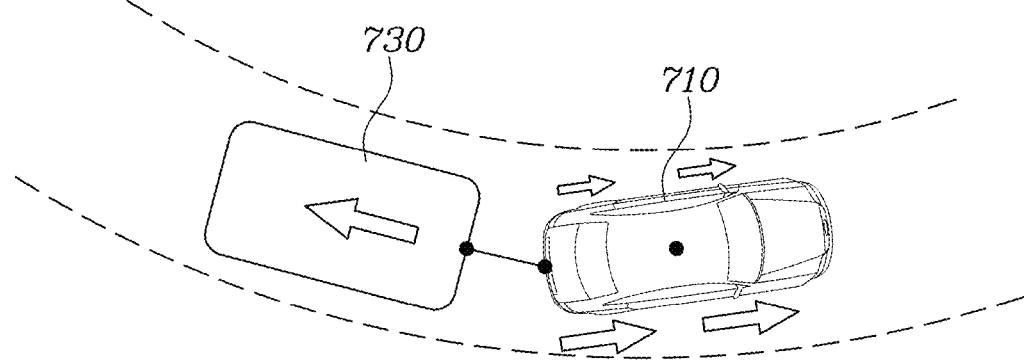

FIG. 7 is a diagram illustrating an example of compensating for the Z-axis momentum that occurs when a trailer-mounted vehicle drives on an uphill turning section.

Referring to FIG. 7, when the trailer-mounted vehicle drives on an uphill turning section, the trailer 730 generates the Z-axis momentum against the vehicle 710 due to the inertial force and gradient (gravity). This indicates additional turning force that occurs when the vehicle turns uphill.

The power determination unit 151 determines the gradient resistance or gradient acceleration force of the vehicle 710 based on the slope of the road and the weight of the trailer 730, the information of which acquired from the electronic control unit 131, and determines the inertial force of the trailer 730 on the basis of the weight of the trailer 730 and the driving force or braking force of the vehicle 710.

In addition, the momentum determination unit 153 determines the Z-axis momentum of the vehicle due to the trailer 730 based on the gradient resistance and inertial force of the trailer 730 determined by the power determination unit 151.

In addition, the compensation determination unit 157 determines insufficient Z-axis momentum based on the Z-axis momentum determined by the momentum determination unit 153 and the current steering angle determined by the driver-input processing unit 155. This is important for maintaining the stability of the vehicle by accurately calculating the insufficient rotational force generated when the vehicle turns.

In addition, the target driving force determination unit 159 determines a lopsided acceleration force based on the driver's target steering determined by the momentum determination unit 153 and the insufficient Z-axis momentum.

When the vehicle 710 is unable to turn to the left, compared to the driver's intention, due to the gradient resistance and inertial force of the trailer 730 as shown in FIG. 7, the target driving force determination unit 159 may apply a greater acceleration force to the right wheel of the vehicle to compensate for the imbalance that occurs when the vehicle turns uphill, thereby assisting in maintaining the stability of the vehicle.

Referring back to FIG. 1, the drive source 170 receives information about the driving force and braking force for each wheel from the electronic control and braking unit 130 and controls the vehicle on the basis of the same.

The drive source 170 may control each wheel of the vehicle.

Figure 8:
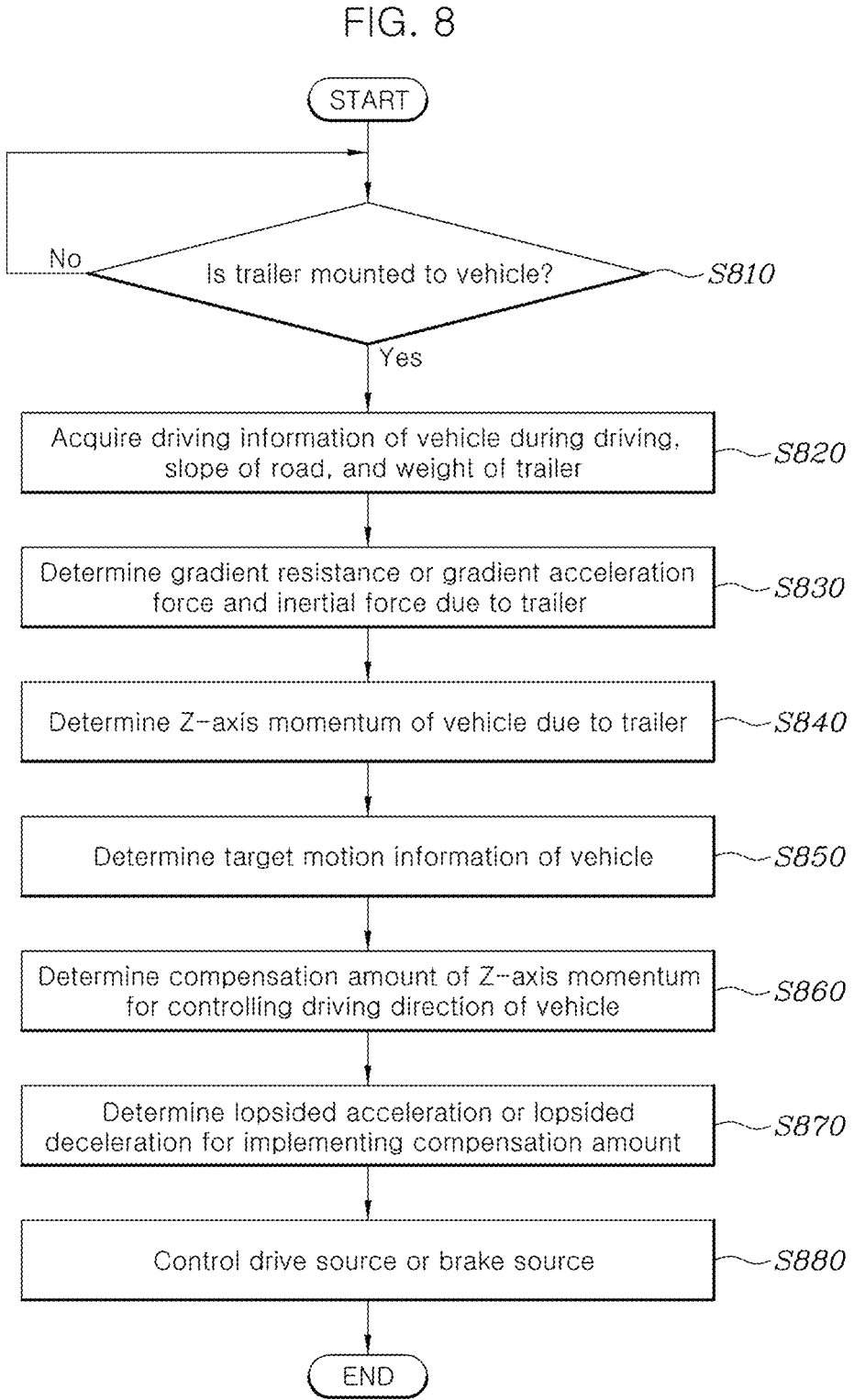
FIG. 8 is a flowchart illustrating a driving control method of a trailer-mounted vehicle according to an embodiment of the present disclosure.

FIG. 8 is a flowchart illustrating a driving control method of a trailer-mounted vehicle according to an embodiment of the present disclosure.

The driving control method according to an embodiment of the present embodiment may be performed by the processor 150 in FIG. 1.

Referring to FIG. 8, the processor 150 determines whether or not a trailer is mounted to the vehicle (step S810) and, if the trailer is mounted to the vehicle, acquires driving information of the vehicle during driving, the slope of a road, and the weight of the trailer (step S820).

The driving information of the vehicle may include at least one of a steering angle, a yaw rate, a driving force, an APS, a braking force, or a BPS, or a combination thereof.

The steering angle may be received from a steering angle acquisition unit 111.

The steering angle acquisition unit 110 may be an MDPS (motor driven power steering) of the vehicle.

The yaw rate may be received from a yaw rate acquisition unit 113.

The yaw rate acquisition unit 113 may be a CDCU (chassis domain control unit) and/or a TCS (traction control system) of the vehicle.

The driving force, the slope of the road, the weight of the trailer, and the APS may be received from the electronic control unit 131.

The electronic control unit 131 may be an ECU (electronic control unit) and/or a VPC (vehicle power control) of the vehicle.

The APS indicates the driver's pressure on the accelerator pedal.

Information of the braking force and the BPS may be received from the braking unit 133.

The braking unit 133 may be an IEB (integrated electric brake) of the vehicle.

The BPS indicates the driver's pressure on the brake pedal.

The processor 150 determines a gradient resistance or gradient acceleration force and an inertial force due to the trailer (an operation S830).

The gradient resistance or gradient acceleration force due to (i.e., caused by) the trailer is determined based on the slope of the road and the weight of the trailer.

The gradient resistance or gradient acceleration force due to the trailer may be defined as a force acting due to the gradient of the trailer.

The gradient resistance due to the trailer indicates the resistance generated by the trailer when driving on a steep road. This is a resistant force generated by gravity when the trailer goes up a slope, and is proportional to the slope angle of the road and the weight of the trailer.

The gradient acceleration force of the trailer indicates an acceleration force generated by the trailer when driving on a steep road. This is an acceleration force generated by gravity when the trailer goes down a slope, and is proportional to the slope angle of the road and the weight of the trailer.

The inertial force of the trailer indicates the force by which the trailer continues to move in the original direction and at the original speed when the vehicle mounted with the trailer turns or brakes while driving.

The inertial force by the trailer may be determined based on the weight of the trailer and the acceleration of the vehicle.

The inertial force due to the trailer may be calculated by Equation 1 above.

The acceleration of the vehicle may be determined based on the driving force or braking force of the vehicle and the steering direction of the vehicle.

The gradient of the road, the current acceleration of the vehicle, and the current steering angle may be defined as current motion information of the vehicle.

Therefore, the inertial force due to the trailer may be determined based on the weight of the trailer and the current motion information of the vehicle.

In addition, the processor 150 determines the Z-axis momentum of the vehicle due to the trailer based on the gradient resistance due to the trailer and the inertial force of the trailer determined in step S820 (step S840).

The Z-axis momentum of the vehicle due to the trailer represents the force received by the gradient acceleration force and inertial force of the trailer when the vehicle mounted with the trailer accelerates or decelerates on a curved road.

The Z-axis momentum of the vehicle may be calculated by Equation 2 above.

In addition, the processor 150 determines target motion information of the vehicle (step S850).

The target motion information may include a target steering angle, an APS, and a BPS.

In addition, the processor 150 determines a compensation amount of the Z-axis momentum for controlling the driving direction of the vehicle (step S860).

The compensation amount of the Z-axis momentum may be defined as the compensation momentum.

The compensation momentum represents the compensation amount of the Z-axis momentum required for the vehicle.

The compensation momentum may be determined on the basis of the target motion information of the vehicle and the Z-axis momentum.

The difference in the deceleration force or acceleration force between the left and right wheels may be determined by the Z-axis momentum.

The processor 150 may determine the compensation momentum based on the difference in the deceleration force between the left and right wheels when the vehicle decelerates.

The compensation momentum may be calculated by Equation 3 above.

The processor 150 may determine the compensation momentum based on the difference in the acceleration force between the left and right wheels when the vehicle accelerates.

The compensation momentum may be calculated by Equation 4 above.

In addition, the processor 150 determines lopsided acceleration or lopsided deceleration for implementing the compensation amount on the basis of the target acceleration of the vehicle, target driving direction, and the compensation amount of the Z-axis momentum determined in step S840 (step S870), and controls the vehicle on the basis of the same (step S880).

The processor 150 may transmit the lopsided acceleration or lopsided deceleration for implementing the compensation amount to the electronic control and braking unit 130, and the electronic control and braking unit 130 may control the drive source and the brake source on the basis of the same, thereby controlling the vehicle.

When a vehicle is capable of driving force control for each wheel, the processor 150 may perform separate driving force control for each wheel, thereby outputting driving force required for each wheel.

If the driving force control is impossible for each wheel, the processor 150 may perform lopsided braking after performing control to output the same driving force for the respective wheels, thereby outputting driving force required for each wheel.

At this time, the processor 150 may add a driving force equivalent to the lopsided deceleration so as to maintain the entire target driving force so that the driver does not feel a sense of incongruity due to the lopsided braking.

However, the processor 150 may not perform the lopsided braking when the driver requests a large driving force.

According to embodiments of the present disclosure described above, it is possible to reduce sensitive actions and miscontrols (i.e., errored controls) or false alarms that lower reliability by causing discomfort and fatigue to the vehicle occupants, thereby improving the reliability of the vehicle system.

In addition, the present disclosure provides consistent rear-end cross-collision avoidance assistance to the vehicle drivers.

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a read-only memory (ROM), a random-access memory (RAM), a compact disc-ROM (CD-ROM), a magnetic tape, a floppy disk, an optical data storage device, and the like. Therefore, the above detailed description should not be construed in a limitative sense but should be considered in an illustrative sense in all aspects. The scope of the present disclosure should be determined by reasonable interpretation of the appended claims, and all changes and modifications within the equivalent scope of the present disclosure fall within the scope of the present disclosure.

What is claimed is:

1. A method for controlling a trailer-mounted vehicle, the method comprising:

determining, based on current motion information of a vehicle, a force acting due to a gradient of a trailer mounted to the vehicle and an inertial force of the trailer;

determining Z-axis momentum of the vehicle caused by the trailer based on the force acting due to the gradient of the trailer, the inertial force of the trailer, and the current motion information of the vehicle;

determining a compensation amount of the Z-axis momentum based on target motion information of the vehicle and the Z-axis momentum; and controlling at least one of a drive source and a brake source so that a lopsided acceleration or a lopsided deceleration is output from a corresponding wheel for implementing the compensation amount of the Z-axis momentum.

2. The method of claim 1, wherein the Z-axis momentum indicates a quantity of motion of the vehicle in a Z-axis direction.

3. The method of claim 1, wherein the compensation amount of the Z-axis momentum is determined based on a difference in deceleration force between left and right wheels when the vehicle decelerates.

4. The method of claim 3, wherein implementing the compensation amount of the Z-axis momentum is achieved by applying an equal amount of deceleration force to the left and right wheels in opposite directions while the vehicle decelerates.

5. The method of claim 1, wherein the compensation amount of the Z-axis momentum is determined based on a difference in acceleration force between left and right wheels when the vehicle accelerates.

6. The method of claim 5, wherein implementing the compensation amount of the Z-axis momentum is achieved by applying a lopsided deceleration to one wheel among the left and right wheels, and the compensation amount of the Z-axis momentum is configured to cause the drive source to output a driving force corresponding to the amount of the lopsided deceleration when the vehicle accelerates.

7. The method of claim 1, wherein the current motion information comprises a gradient of a road, a current acceleration of the vehicle, and a current steering angle of the vehicle.

8. The method of claim 1, wherein the target motion information comprises a target steering angle, an accelerator pedal position, and a brake pedal position.

9. The method of claim 1, wherein the drive source is configured to separately control a driving force for each wheel.

10. An apparatus for controlling a trailer-mounted vehicle, the apparatus comprising:

a processor configured to determine, based on current motion information of a vehicle, a force acting due to a gradient of a trailer mounted to the vehicle and an inertial force of the trailer, determine Z-axis momentum of the vehicle caused by the trailer based on the force acting due to the gradient of the trailer, the inertial force of the trailer, and the current motion information of the vehicle, determine a compensation amount of the Z-axis momentum based on target motion information of the vehicle and the Z-axis momentum, and control at least one of a drive source and a brake source so that a lopsided acceleration or a lopsided deceleration is output from a corresponding wheel for implementing the compensation amount of the Z-axis momentum;

a drive source driven by the processor; and a brake source driven by the processor.

11. The apparatus of claim 10, wherein the Z-axis momentum indicates a quantity of motion of the vehicle in a Z-axis direction.

12. The apparatus of claim 10, wherein the compensation amount of the Z-axis momentum is determined based on a difference in deceleration force between left and right wheels in response to the vehicle decelerating.

13. The apparatus of claim 12, wherein implementing the compensation amount of the Z-axis momentum is achieved by applying an equal deceleration force to the left and right wheels in opposite direction while the vehicle decelerates.

14. The apparatus of claim 10, wherein the compensation amount of the Z-axis momentum is determined based on a difference in acceleration force between left and right wheels in response to the vehicle accelerating.

15. The apparatus of claim 14, wherein implementing the compensation amount of the Z-axis momentum is achieved by applying a lopsided deceleration to one wheel among the left and right wheels, and the compensation amount of the Z-axis momentum is configured to cause the drive source to output a driving force corresponding to the amount of the lopsided deceleration in response to the vehicle accelerating.

16. The apparatus of claim 10, wherein the current motion information comprises a gradient of a road, a current acceleration of the vehicle, and a current steering angle of the vehicle.

17. The apparatus of claim 10, wherein the target motion information comprises a target steering angle, an accelerator pedal position, and a brake pedal position.

18. The apparatus of claim 10, wherein the drive source is configured to separately control a driving force for each wheel.

\* \* \* \* \*